(12) United States Patent
Knoll et al.

(10) Patent No.: US 11,364,454 B2
(45) Date of Patent: Jun. 21, 2022

(54) FILTER MEDIA FOR THE REMOVAL OF PARTICLES, IONS, AND BIOLOGICAL MATERIALS, AND DECOLORIZATION IN A SUGAR PURIFICATION PROCESS, AND USE THEREOF

(71) Applicant: Graver Technologies LLC, Glasgow, DE (US)

(72) Inventors: James Knoll, Glen Gardner, NJ (US); Katie Henderson, Smyrna, DE (US); Bruce Belcher, Landenberg, PA (US); Joshua Mertz, Townsend, DE (US)

(73) Assignee: Graver Technologies LLC, Glasgow, DE (US)

( * ) Notice: Subject to any disclaimer, the term of this patent is extended or adjusted under 35 U.S.C. 154(b) by 213 days.

(21) Appl. No.: 16/420,720

(22) Filed: May 23, 2019

(65) Prior Publication Data

US 2019/0376154 A1   Dec. 12, 2019

Related U.S. Application Data

(60) Provisional application No. 62/681,737, filed on Jun. 7, 2018.

(51) Int. Cl.
*B01D 15/00* (2006.01)
*B01D 15/36* (2006.01)
(Continued)

(52) U.S. Cl.
CPC ....... *B01D 15/363* (2013.01); *B01D 39/2041* (2013.01); *B01J 20/20* (2013.01);
(Continued)

(58) Field of Classification Search
None
See application file for complete search history.

(56) References Cited

U.S. PATENT DOCUMENTS 2,400,598 A   5/1946   Prager
2,488,851 A   12/1949   Copp
(Continued)

FOREIGN PATENT DOCUMENTS

DE   19628324 A1 *   1/1998   ............... C08L 1/02

OTHER PUBLICATIONS

DE-19628324-A1—English translation (Year: 1998).*
(Continued)

*Primary Examiner* — Stefanie J Cohen
(74) *Attorney, Agent, or Firm* — DeLio Peterson & Curcio LLC; Robert Curcio (57) ABSTRACT

A filter media for implementation in a sugar purification process that allows for a significant increase in sorbent material while maintaining, and enhancing the decolorization and. hydraulic properties. The filter media incorporates sorbent material, fiber having specific properties that allows for small particle sorbent material without jeopardizing the hydraulic properties of the media, and an electrolyte. The sorbent material is an inorganic, an adsorption, or ion exchange media, or a metal-organic framework. The implementation of this filter media in a sugar purification process eliminates the need for a clarification step during refining while providing for enhanced decolorization and hydraulic properties for fluid flow.

18 Claims, 5 Drawing Sheets

(51) Int. Cl.

| | | |
|---|---|---|
| *C13B 20/16* | (2011.01) | |
| *B01J 20/28* | (2006.01) | |
| *B01D 39/20* | (2006.01) | |
| *C02F 9/00* | (2006.01) | |
| *B01J 39/18* | (2017.01) | |
| *C13B 30/02* | (2011.01) | |
| *B01J 20/20* | (2006.01) | |
| *C02F 11/122* | (2019.01) | |
| *C02F 1/52* | (2006.01) | |
| *C02F 1/28* | (2006.01) | |
| *C02F 1/42* | (2006.01) | |
| *C02F 1/00* | (2006.01) | |
| *C02F 101/10* | (2006.01) | |
| *C02F 103/32* | (2006.01) | |
| *C02F 101/30* | (2006.01) | |

(52) U.S. Cl.
CPC ... *B01J 20/28004* (2013.01); *B01J 20/28066* (2013.01); *B01J 20/28076* (2013.01); *B01J 39/18* (2013.01); *C02F 9/00* (2013.01); *C13B 20/16* (2013.01); *C13B 30/02* (2013.01); *B01D 2239/0407* (2013.01); *B01D 2239/0435* (2013.01); *C02F 1/004* (2013.01); *C02F 1/283* (2013.01); *C02F 11/122* (2013.01); *C02F 2001/422* (2013.01); *C02F 2001/5218* (2013.01); *C02F 2101/103* (2013.01); *C02F 2101/308* (2013.01); *C02F 2103/32* (2013.01)

(56) References Cited

U.S. PATENT DOCUMENTS

| | | | | |
|---|---|---|---|---|
| 4,190,532 | A * | 2/1980 | Halbfoster | B01D 37/02 210/504 |
| 4,216,073 | A * | 8/1980 | Goldstein | B01D 61/46 204/296 |
| 4,238,334 | A * | 12/1980 | Halbfoster | B01D 37/02 210/504 |
| 4,572,742 | A | 2/1986 | Kunin et al. | |
| 4,747,955 | A | 5/1988 | Kunin | |
| 5,308,494 | A | 5/1994 | Brandon et al. | |
| 5,346,624 | A | 9/1994 | Libutti et al. | |
| 5,376,278 | A | 12/1994 | Salem | |
| 5,451,431 | A | 9/1995 | Purnell et al. | |
| 5,585,171 | A | 12/1996 | Libutti et al. | |
| 6,429,830 | B2 | 7/2002 | Strom et al. | |
| 6,835,311 | B2 * | 12/2004 | Koslow | C02F 1/003 210/490 |
| 7,287,650 | B2 * | 10/2007 | Koslow | A01N 25/34 210/501 |
| 8,512,475 | B2 | 8/2013 | Bojorquez Valenzuela et al. | |
| 8,580,226 | B2 | 11/2013 | Knoll et al. | |
| 9,352,267 | B2 | 5/2016 | Krupnikov et al. | |
| 2008/0135489 | A1 * | 6/2008 | Saaski | B01J 20/20 210/688 |
| 2009/0218292 | A1 * | 9/2009 | Mitchell | B01D 39/1623 210/694 |
| 2014/0021139 | A1 * | 1/2014 | Choo | B01J 20/18 210/687 |
| 2016/0144355 | A1 | 5/2016 | Bortun et al. | |
| 2016/0256865 | A1 | 9/2016 | Knoll et al. | |
| 2017/0225968 | A1 | 8/2017 | Gaur et al. | |

OTHER PUBLICATIONS

Wang et al, Synthesis of a magnetic polystyrene-based cationexchange resin and its utilization for the efficient removal of cadmium (II), May 2018, IWA Publishing, Water Science and Technology, Bonus Issue 3 (Year: 2018).*

Chen et al. "Enzyme Immobilization on Ultrafine Cellulose Fibers via Poly(Acrylic Acid) Electrolyte Grafts." Biotechnology and Bioengineering, vol. 90, No. 4 May 20, 2005, pp. 405-414.

Ito et al. "Thermal Expansion of High Filler Content Cellulose-Plastic Composites." Journal of Wood Chemistry and Technology, vol. 30, No. 4, Nov. 20, 2010, pp. 360-372.

Olsson et al. "Influence of the Cellulose Substrate on the Electrochemical Properties of Paper-Based Polypyrrole Electrode Materials." Journal of Materials Science, vol. 47, No. 13, Mar. 15, 2012, pp. 5317-5325.

* cited by examiner

FILTER MEDIA FOR THE REMOVAL OF PARTICLES, IONS, AND BIOLOGICAL MATERIALS, AND DECOLORIZATION IN A SUGAR PURIFICATION PROCESS, AND USE THEREOF

BACKGROUND OF THE INVENTION

1. Field of the Invention

The invention relates to the removal of contaminants from water/aqueous solutions as is essential to the industry, specifically in terms of quality and human health. The contaminants to be removed may be classified in a number of ways, e.g., heavy metals, persistent organic pollutants, and the like. More particularly, the present invention relates to the removal of such contaminants from sugar solutions. Removal of these contaminants is also necessary for qualitative purposes, e.g., taste and sugar color.

2. Description of Related Art

Sugar refineries use multi-step processes to convert raw sugar into different products. Most cane sugar refineries use chemical clarification processes (i.e. "phosphatation" or) "carbonatation" prior to their primary decolorizing operation. The purpose of these chemical clarification processes is to remove colloidal and semi-soluble impurities which can negatively impact both regenerable decolorizing systems and the quality and yield of the crystallization process. Both of these methods of chemical clarification reduce plant pigments, such as color bodies, but contribute to caramel and alkaline degradation product color body generation. Application of carbon based adsorbents and/or ion exchange resins post-clarification (where the sugar is dissolved into a syrup/liquid form) effectively reduce these color bodies prior to crystallization. These adsorbents/resins are typically used in a cake form, through which syrup/liquid sugar passes through as it is pumped into a filter press.

In U.S. Pat. No. 5,346,624 issued on Sep. 13, 1994, titled "METHOD AND APPARATUS FOR TREATMENT OF AQUEOUS SOLUTIONS," a method of removing ionic and suspended particulate impurities from a liquid is taught whereby the liquid is directed through a filter media bed having a mixture of ion exchange fibers, ion exchange resin particles, and inert fibers. The inert fibers are treated with a polyelectrolyte to produce a clumping phenomenon.

The ion exchange resin particles include anion exchange resin particles, cation exchange resin particles, or a mixture thereof. The amount of ion exchange fibers in the filter media bed is on the order of 20% to 80% in one embodiment, and 5% to 30% in a second embodiment. The amount of ion exchange resin particles is on the order of about 1% to 90%. Both the ion exchange particles and inert fibers are necessary for the filter media bed performance.

The adsorption capacity and properties of any adsorbent are generally dependent solely on the freely available surface area of the adsorbent. Typically, the larger the surface area, the more available capacity and the faster the reaction rate. For materials used in water treatment, the prior art demonstrates that smaller particle size results in higher capacities, because more surface is available for reactions/adsorption. However, in the water treatment and sugar purification industries, the particle size also contributes to physical properties of the system. Given several factors, including flow, smaller particle sizes result in having a tighter packing of solid particulates, smaller particles used in a flow-through system result in higher pressure differentials. The filter cakes used to reduce color bodies create a pressure drop that constantly increases over time due to buildup of contaminants in the cake as the liquid sugar is continuously pumped into the filter press. In some cases the filtration bed of the prior art utilizing ion exchange resins, activated carbon, and other filter media constituents, must have a deeper bed (more media) to accomplish the needed color removal. Furthermore, the buildup of pressure can lead to a need to replace the filter cake prior to the cake losing its chemical filtration capabilities. Moreover, high pressure differential can reduce flow and may harm the containment of the system. It is thus desirable to maximize the surface area of the particles while keeping or reducing the system pressure. In this way, a media can have a higher capacity and last longer (physically) in the process.

A more open-structured sorbent capable of having higher capacity and better use during higher flows would reduce pressure and would allow the optimal chemical/particulate sorption (optimization). Thus, to increase efficiency and reduce waste, the amount of contaminant removed per amount of sorbent (the capacity) needs to be increased.

SUMMARY OF THE INVENTION

Bearing in mind the problems and deficiencies of the prior art, it is therefore an object of the present invention to provide a cost-effective filter media with a sorbent having an increased capacity that simultaneously requires less filtration aid to be used, which in effect reduces the bed depth while enhancing the filter media hydraulic performance.

It is another object of the present invention to provide a sorbent having an improved flow rate and decolorization capacity.

A further object of the invention is to provide a filter media having a sorbent with an extended filtration life that creates minimal to no pressure drop as liquid sugar is pumped through it.

Another object of the invention is to provide a sorbent with the smallest possible particle size, thus increasing its capacity, kinetic rates, while maintaining appropriate flows suitable to the treatment process without an extensive buildup of pressure (hydraulic properties).

It is yet a further object of the present invention to provide a method for purifying and decolorizing sugar that omits the clarification process step by using filter media with enhanced hydraulic properties.

Still other objects and advantages of the invention will in part be obvious and will in part be apparent from the specification.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE EMBODIMENT(S)

in describing the embodiment(s) of the present invention, reference will be made herein to FIGS. 1-9 of the drawings in which like numerals refer to like features of the invention.

The present invention teaches a filter media for implementation in a sugar purification process that allows for a significant increase in sorbent material while maintaining, and in fact enhancing the decolorization and hydraulic properties as compared to prior art filter media. The implementation of this filter media in a sugar purification process may also eliminate the need for an otherwise necessary clarification step during purification.

In an embodiment, the sorbent of the filter media of the present invention is comprised of a mixture of wood-, coal-, or coconut-activated carbon, ion exchange resin, and. may include inorganic sorbent media, such that when combined with fiber of specific property, may be effectively utilized in sugar refineries to remove color, such as ions, colorbodies, dextrans, and the like. A diatomaceous earth precoat can be used to coat a filter press. Once loaded with diatomite, the filter media is made into a slurry and dosed into a stream containing water, or water and dissolved sugar. The invention is dosed into the water based on the ICUMSA color and the Brix content of the solution. When a certain filter bed depth is achieved, the sugar solution containing color bodies and other contaminants is passed through the precoat and the filter media/filter press. The resultant effluent of the system has been shown to contain a reduced amount of contaminant as depicted by the resultant color.

In another embodiment, the filter media of the present invention is comprised of a sorbent material (an activated carbon, ion exchange resin, adsorption media), an electrolyte and fiber, designed especially for use in sugar refineries to remove color. The added adsorption media is designed to remove ions—heavy metals such as Pb, Hg, and Cd; oxyanions such as arsenate, arsenate, selenate, selenite; and/or ash such as calcium, magnesium, or carbonates.

In a further embodiment, the sorbent of the present invention is used for the reduction of organic pollutants such as glyphosate, dextrans, and persistent organic pollutants ("POPs").

In still a further embodiment, the employment of the filter media of the present invention in a sugar purification process will reduce the moisture level of the resultant product to below 10% water content by weight. Additionally, the filter media of the present invention when implemented in pharmaceutical ingredients has the ability to remove and recover precious metals such as rhodium, platinum, and the like.

In yet another embodiment, the filter media and/or sorbent of the present invention used in a bed through which gas flows is capable of capturing certain contaminants such as diatomic iodine ($I_2$) through the implementation of such an embodiment.

In another embodiment, the fibers used in the filter media are pre-treated with a solution or a solid whereby the fiber is functionalized with a chemical functional group, crystalline material or compound, or a sorbent (crystalline or amorphous). The functionalizing of the fibers yields unique properties for the fibers to remove contaminants, for example, the addition of a pre-treatment with $TiO_2$ is used to capture arsenic, or anionic functionalization of the fibers may be employed to remove cations.

In the art, particle size distribution may be measured using the diameter of the sphere, which divides a sample of mass into a specific weight percentage when the particles are arranged on an ascending mass basis—also known as a D-value. As an example, a D10 of 30 µm equals the diameter at which 10% of the sample's mass is comprised of particles with a diameter less than 30 µm. D50 equals 50% of such value, and D90 equals 90%.

In an embodiment of the present invention, the ion-exchange resin has a D-value of D50 of the range 5-100 µm. The D50 of carbon in an embodiment is in a range of 0-50 µm.

The carbon particles in the sorbent embodiments preferably have pore volume ranges from 1.0-2.5 cc/g, and a surface area range of 1,300-2,500 $m^2/g$. The majority of specialty fibers in the sorbent embodiments of the present invention have diameters ranging from 200-1500 nanometers, lengths between 0.5-1000 micrometers, a Canadian Standard of Freeness ("CSF") between 0-100 (which measures the rate of drainage of a diluted pulp suspension; the higher the number, the faster the drainage), and surface areas between 0-200 $m^2/g$.

From a compositional standpoint, the preferred filter media may be in at least one embodiment a mat or "cake" composed substantially of the mixture of the present invention. By way of example, the percent compositional range of the mixture includes (by weight %): a) a sorbent media having a composition that may be inclusive of carbon, inorganic, adsorption, ion-exchange media, and/or metal-organic framework, and preferably comprising 25-50 wt %; b) fiber 0.01-10 wt %; and c) an electrolyte 0.01-1 wt % electrolyte.

The percent compositional range of the sorbent mixture (by weight %) may be inclusive of carbon, inorganic, adsorption, ion-exchange media, and/or metal-organic framework, and may comprise 0.001-99% carbon by weight; 0.001-99.9% ion exchange resin by weight; and 0.001-99.9% inorganic sorbent media by weight.

Figure 1:
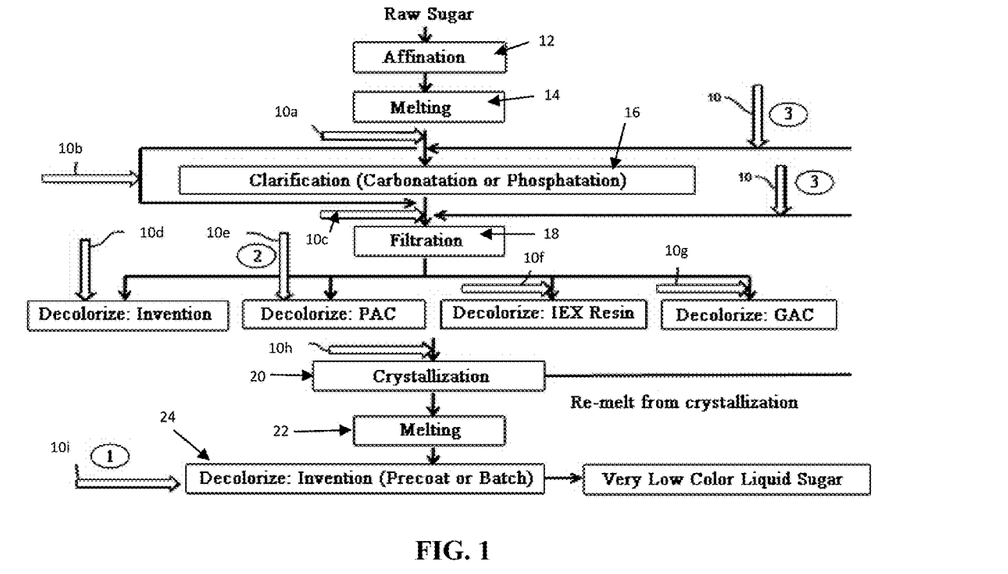
FIG. 1 depicts a block diagram of a typical sugar purification process showing potential introduction points for introducing the filter media of the present invention into the process.

The composition of the present invention is versatile because it can be introduced at any point in a purification process that involves liquid/syrup sugar, as represented by arrows 10 in FIG. 1. FIG. 1 depicts a block diagram of a typical sugar purification process showing potential introduction points for introducing the filter media of the present invention into the process. Effectively, the introduction of the filter media of the present invention can be performed at certain points within three stages within a sugar process. For example, the filter media may be employed after crystallization and melting for further decolorizing in a precoat or batch process to achieve a very low color liquid sugar as indicated by filtration stage 1. The filter media may also be employed during the filtration stage 2 to decolorize the sugar prior to crystallization. The filter media may also be implemented before, during, or after a clarification stage of carbonation or phosphatation.

One of the initial stages of processing the liquor (liquid sugar) is aimed at removing the solids which make the liquor turbid. In this stage, some of the color is removed as well.

Generally, there are two common methods of color removal in refineries, both relying on sorption techniques with the liquor being pumped through columns of medium. One option open to the refinery is to use granular activated carbon (GAC) which removes most color but little else. The carbon is regenerated in a hot kiln where the color is burnt off from the carbon. Another option is to use an ion exchange resin which removes less color than GAC but also removes some of the inorganics present. The resin is regenerated chemically which gives rise to large quantities of unpleasant liquid effluents. These options have their limitations in efficacy of color removal, flow rate limitations, and filter efficiency.

One of the two common processing techniques in a sugar purification process is known as carbonatation, where small clumps of chalk are grown in the juice. The clumps, as they form, collect a significant amount of the non-sugars, so that by filtering out the chalk one also takes out the non-sugars. The other technique, phosphatation, is chemically similar but uses phosphate rather than carbonate formation to achieve a similar result. The implementation of either technique is referred generally as "clarification".

Figure 2:
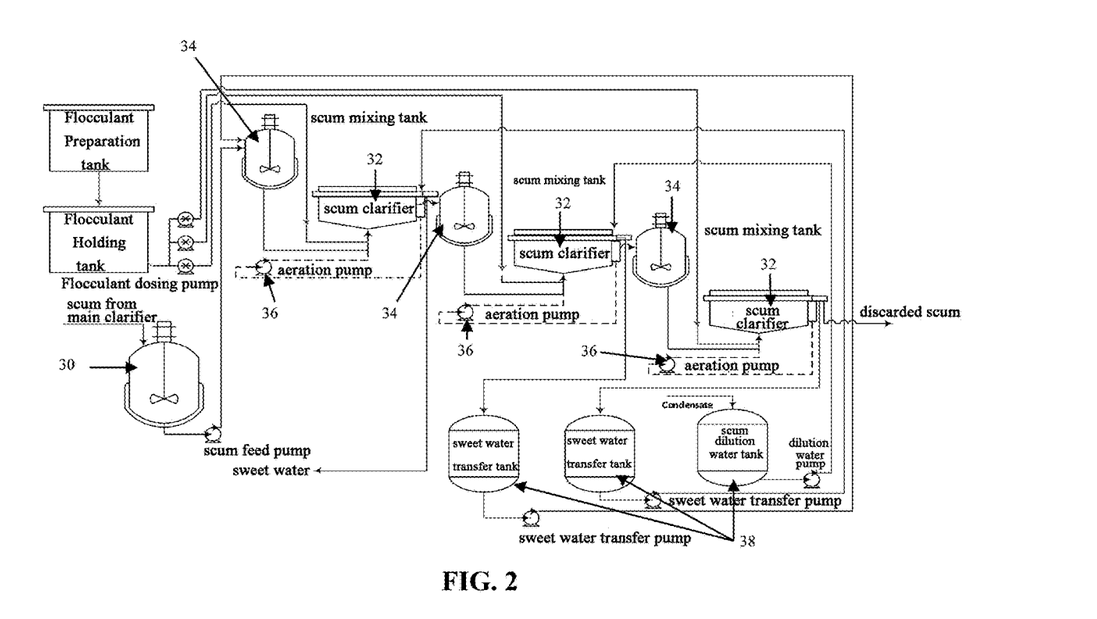
FIG. 2 depicts a process flow delineating three clarifiers for scum flotation, each utilized after mixing.

In general, phosphatation processes require lower capital investment and lower maintenance costs compared to carbonatation; however, the operating costs are significantly higher with phosphatation due to high chemical consumption. In addition, the phosphatation process is somewhat prone to process upsets that can lead to periods of time with very high chemical usage and clarified liquor of poor quality. Phosphatation processes generate less waste than carbonatation, but the scum originating from the clarifier must be treated to minimize process losses. Thus, scum "de-sweetening" consists of a second clarification, generally in three countercurrent stages, where three small clarifiers may be used for flotation. FIG. 2 depicts a process flow delineating three clarifiers for scum flotation, each utilized after mixing. Scum removed from the clarifier is diluted to about 20° Brix and clarified again by applying a polyelectrolyte and after three de-sweetening stages its sugar content is low enough to allow it to be discarded.

In FIG. 2, scum from a scum main clarifier is directed to a first mixing tank 30, which output is delivered in series application to three scum clarifiers 32 in succession, which are used with successive scum mixing tanks 34. Each scum clarifier 32 is aerated by an aeration pump 36. The output of each scum clarifier 32 is held in a sweet water transfer tank 38.

Following the process stages of FIG. 1, the filter media of the present invention, preferably in the form of a powder solution, can be introduced directly into the liquid sugar 10a after primary affiliation 12 and melting 14. In an aflination process, the raw sugar is first mixed with heavy syrup and centrifuged to wash away the outer coating of the raw sugar crystals, which is less pure than the crystal interior.

Alternatively or in addition, the filter media may be introduced 10b during the clarification stage 16, or just after the clarification stage 10c, and prior to the filtration stage 18. In the clarification stage 16, the sugar is clarified by the addition of phosphoric acid and calcium hydroxide that combine to precipitate calcium phosphate. The calcium phosphate particles entrap some impurities and absorb others, and then float to the top of the tank, where they are skimmed off.

After any remaining solids are filtered out, the clarified syrup is decolorized by filtration. The filter media may be introduced at anytime during the decolorization 10d via filter media of the present invention, 10e (decolorization via powder activated carbon), 10f (decolorization via ion exchange resin), 10g (decolorization via granular activated carbon), or just after the decolorization stage 10h and prior to the crystallization 20 and (re)melting stage 22. As shown, in this introduction of the filter media, it may be used in conjunction with powder activated carbon (PAC), ion exchange resin, and/or granular activated carbon (GAC). Last, the filter media may be employed 10i during the final decolorization step stage which may be represented in a precoat or batch phase.

At some point in the purification process, raw sugar is converted into a syrup or liquid form. An embodiment of the present invention is presented preferably in the fowl of a powder comprising the sorbent mixture as described herein, which consists of powder-activated carbons (es., wood-, coal-, or coconut-carbon), ion exchange resins, and fiber. This powder solution is introduced directly into the melted, liquid sugar, and is then agitated for a pre-determined amount of time. During agitation, the powder solution of the present invention has already begun the decolorizing process of the liquid sugar.

The fiber diameter is preferably in the range of 200-1500 nanometers, having a length of 0.5-1000 µm, and a surface area in the range of 0-200 $m^2/g$. Fiber having such characteristics is capable of being utilized with the sorbent of the present invention to achieve a greater capacity of sorbent that exhibits favorable hydraulic properties of flow and pressure than would otherwise be realized with fiber/sorbent combinations of the prior art.

After agitation, resultant slurry (comprising the liquid sugar and powder-form solution of the present invention) is pumped into the filter press. During this procedure, the slurry is sifted as the powder solution of one of the embodiments of the present invention separates from the liquid sugar, with such powder solution building up within the press. This buildup further acts as a filter that assists in decolorization of the syrup/liquid sugar as the liquid sugar continues to be pumped through the buildup with minimal (or even non-existing) pressure drop. In this manner, more of the physical/chemical capacity of the material is used in comparison to prior art filter media.

Figure 3:
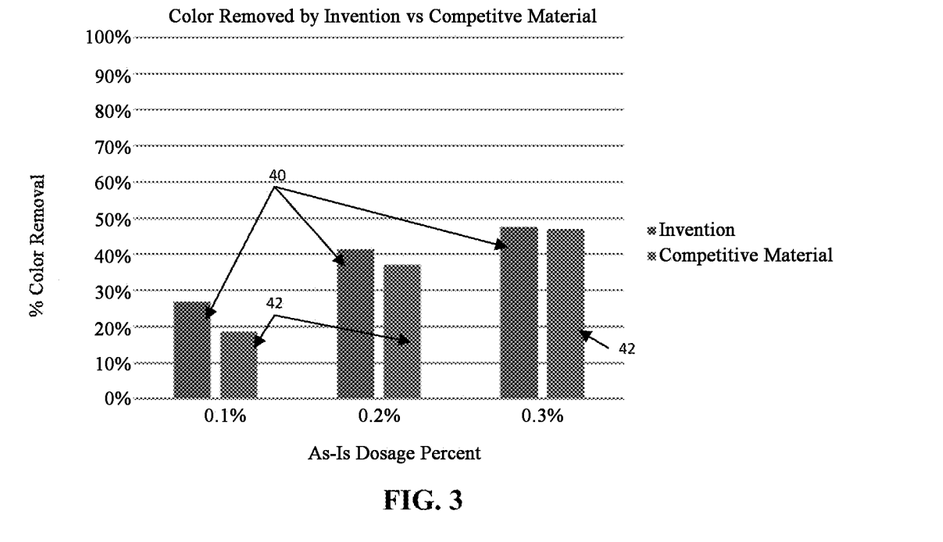
FIG. 3 depicts a comparative result summary of the color removed by the filter media of the present invention against a competitive material found in the prior art processes.

FIG. 3 depicts a comparative result summary of the color removed by the filter media of the present invention against a competitive material found in the prior art processes. Referring to FIG. 3, two materials were chosen to reduce the color in sugar. The invention filter media 40 removed a greater percentage of color from the sugar than a competitive material 42 at each dosage level. At the lower dosage, the current invention has the higher capacity compared to the competitive material.

By incorporating fiber having properties on the order of 200-1500 nanometers in diameter, having a length of 0.5-1000 µm, and a surface area in the range of 0-200 $m^2/g$, into the powder solution, the overall porosity of the post-agitation buildup in the filter press is decreased. Even with such decreased porosity, this buildup unexpectedly results in little to no pressure drop as liquid sugar is pumped through the filter press. Advantageously, the addition of this small amount of fiber allows for an increase in the sorbent material without sacrificing the desired hydraulic properties of the filter media.

Figure 4:
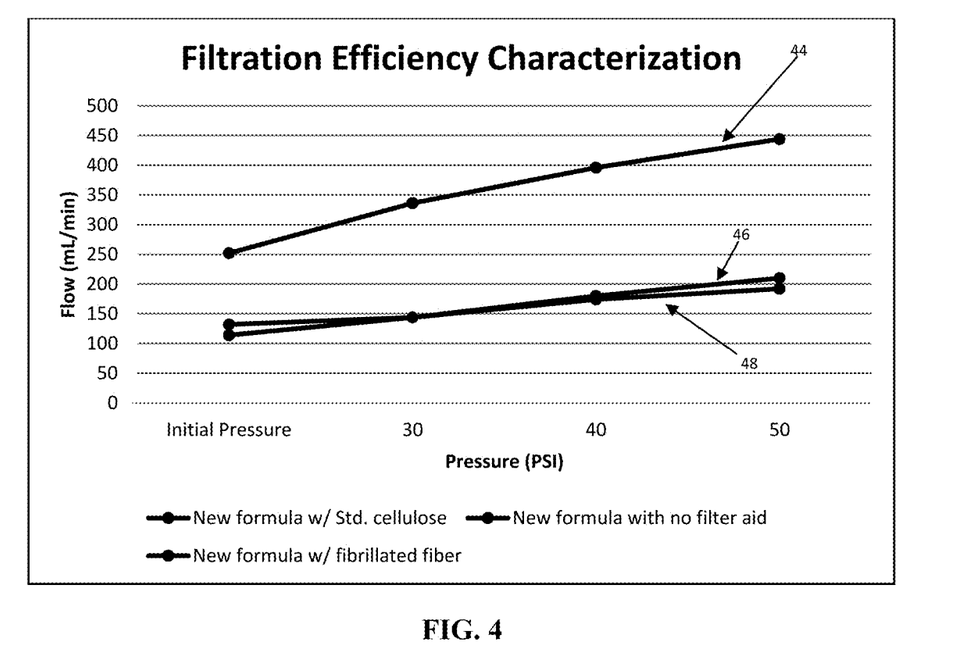
FIG. 4 depicts the filtration efficiency characterization for three different variations of filter media of the present invention, which were tested for efficiency by measuring the flow rate (in milliliters per minute) over pressure (in pounds per square inch)

FIG. 4 depicts the filtration efficiency characterization for three different variations of filter media of the present invention, which were tested for efficiency by measuring the flow rate (in milliliters per minute) over pressure (in pounds per square inch). The efficiency of the filter media is substantially greater when incorporating fiber having parameters of a diameter in the range of 200-1500 nanometers, a length of 0.5-1000 p.m, and a surface area in the range of 0-200 $m^2/g$. A substantial increase in flow rate was achieved when filter media 44 comprising the fiber having the aforementioned characteristic parameters was utilized. The formula of the present invention was also presented in the filter media with standard cellulose 46 rather than the aforementioned fiber. The results of this second test sample were similar to that without filter aid 48.

An unexpected result of the filter media of the present invention is that with increased capacity, less fiber is required and more sorbent can be utilized, especially sorbent having decreased particle sizes as compared to that of the prior art, which collectively results in a reduction of the quantity of filter media needed for the same color removal as the prior art. Furthermore, as noted above, the filter cakes used to reduce color bodies create a pressure drop that constantly increases over time due to buildup of contaminants in the cake as the liquid sugar is continuously pumped into the filter press. In some cases the filtration bed of the prior art utilizing ion exchange resins, activated carbon, and other filter media constituents, must have a deeper bed (more media) to accomplish the needed color removal.

This reduced bed depth further results in an advantageous reduction in differential pressure. The reduced differential pressure and higher capacity of the sorbent of the present invention allows for the treatment of more solution per unit of media used. Competitive materials such as Powder Activated Carbon (PAC) require additional filter aids to achieve capacities similar to the present invention, but the addition of such aids result in an increase in differential pressure, which substantially decreases the amount of solution treated per unit of media.

Another result employing the filter media of the present invention is the use of the filter media product to remove non-color contaminants from the sugar stream. With the invention of pesticides, such as glyphosate, the sugar industry has been able to control ripening of the crops. However the use of these pesticides results in sugar containing trace residues of such chemicals. Likewise, contaminants that naturally occur in the soil such as arsenic, also enter into the plant through different metabolic functions. These heavy metal contaminants are harvested along with the rest of the sugar cane. Trace concentrations of contaminants can be found in the sugar purification process. In one embodiment of the filter media of the present invention, specific adsorbents are added to the filter media to provide selective removal of specific contaminants. Water stable metal organic frameworks (MOFs), inorganic adsorbents (titanium dioxide, manganese oxide, iron oxide, apatite), inorganic framework adsorbents ($K_2Sn_2MnS_6$, $Na_2TiO_3$), zeolites (chabazite, clinoptilolite, and the like) and other materials are designed for the removal of contaminants. The addition of these adsorbents to the filter media material adds new functionality to the filter media which is not implemented by prior art.

Similar to the drinking water and waste water industries, the variation of components by mass is integral to the function of the process in which these products are used. For example, some components may be removed due to regulations in specific areas. The color in liquid sugar is dependent on a variety of factors. Different compounds in the sugar cane contribute to color differently. As such, it is normal for the invention to have a wide range of variation in composition to accommodate for different color bodies being present in the liquid sugar. A sugar that is contaminated with arsenic, for example, would need one type of sorbent, while a different sugar contaminated with pesticides would need a specific sorbent for that pesticide. Since the batches of raw sugar have different colors, the method for using the invention can adjust the dosing amount (kg of media per L of solution treated).

As noted previously, another aspect is that the formulation of filter media has a highly active flow response (does not generate high pressures) while the capacity for contaminants remains high. That is, the hydraulic properties of the filter media are enhanced. An expected result of a corresponding reduction of particle size of the sorbent, would increase capacity and create a tighter packing in the filter. Thus, the system pressure would increase and flow would decrease. However, an unexpected result of the application of the filter media of the present invention with the addition of the specialty fibers described above is that the flow is higher with the fibers than without. The fibers are able to keep the structure of the formulation open and allow sufficient flow, while sufficiently supporting smaller particulates of the sorbent material (carbon, resin, and ion exchange media).

Thus, the filter media of the present invention provides one or more of the following advantages: 1) a cost-effective filter media with a sorbent having an increased capacity that simultaneously requires less filtration media (fiber) to be used, which in effect reduces the bed depth; 2) a sorbent having an improved flow rate and decolorization capacity; and 3) a filter media with an extended filtration life that creates minimal to no pressure drop as liquid sugar is pumped through it.

As an illustrative example, application is applied to a white-end refinery utilizing clarification via a phosphatation/floatation process to treat very high pol sugar (VHP) originating from its own sugar mill. After the phospho-flotation process, the clarified liquor from the clarifier passes through a belt filter to remove any remaining solids, then is decolorized by adding the multifunctional adsorbent filter media described herein to obtain a fine liquor to produce one-grade white sugar by recycling the runoff, mixing it with the fine liquor (backboiling), and yield a refined sugar with a color lower than 40 IU.

In addition, to minimize the volume of runoff sent to the recovery house and to maximize the refinery recovery, part of the runoff is also mixed with the clarified liquor, prior to the decolorization process, in a procedure called "inboiling". The high adsorptive capacity of the adsorbents makes it possible to efficiently remove the additional color and turbidity load from the inboiling process, while still supplying high quality fine liquor to the refinery pan floor to feed crystallization.

Results of the trial, compared to the normal operation with clarification are shown below.

Table I depicts the results (quality measurements) of implementing the filter media of the present invention into a sugar purification process inclusive and exclusive of a clarification step:

TABLE I

| Stream | With clarification | | Without clarification | |
|---|---|---|---|---|
| | Color IU | Turbidity IU | Color IU | Turbidity IU |
| Raw sugar (VHP) | 341 | 129 | 322 | 102 |
| Raw melt liquor | 320 | 208 | 308 | 132 |
| Clarified liquor | 252 | 35 | | |
| Fine liquor | 178 | 9 | 207 | 33 |
| Run off | 1642 | 203 | 1909 | 443 |
| Massecuite | 799 | | 848 | |

Note that while the average turbidity and color levels in the fine liquor are higher without clarification, the color of the refined sugar is identical, and the turbidity level is nearly the same. In this manner, it is possible to omit the clarification phase of the sugar purification process when utilizing the filter media of the present invention. For the current refined sugar markets, the color, turbidity, ash, and insolubles are all well within specifications. It is understood that modifications to the precoat and/or body feed in the primary and secondary filters will improve the final turbidity and insolubles values, if desired.

As noted in Table II below, the increase in turbidity between the raw sugar turbidity, measured by dissolving the raw sugar in deionized water, and the raw melt liquor, made in the factory using sweetwater from various sources in the refinery operation, is much higher while operating the clarifier than without it. This was consistent throughout the trial period. This may be attributed to some of the turbidity coming off the clarifier scums during the desweetening process.

TABLE II

| | With Clarification | | | | Without Clarification | | | |
|---|---|---|---|---|---|---|---|---|
| Stream | Color Mops | Turbidity IU | ash % | Insolubles PPM | Color Mops | Turbidity IU | ash % | Insolubles PPM |
| Refined sugar | 34 | 3.4 | 0.0031 | 6 | 34 | 8.5 | 0.0029 | 8 |
| Refined Sugar Specifications | <40 | <20 | <0.020 | <20 | | | | |

Based on chemical use only (which includes the sorbent and filter aid in the form of the specialty fiber), the cost with and without clarification is approximately the same. As demonstrated in Table III there is a 1% cost advantage by eliminating clarification. However, taking into account some of the additional savings, namely labor savings and reduced maintenance costs, an over-all savings of 7.4% can be realized by eliminating phosphofloatation. Additional savings in energy and water consumption may also be advantageous.

TABLE III

| | USD per ton Refined Sugar | |
|---|---|---|
| Details | With clarification | Without clarification |
| Chemicals | 3.91 | 3.88 |
| Clarification process Operator's salary | 0.17 | 0.00 |
| Maintenance | 0.11 | 0.00 |
| Total | 4.19 | 3.88 |

Thus, the application of filter media of the present invention can effectively reduce cost through the elimination of the clarification step from a sugar purification process.

As depicted in Table IV, the increased solids from the increased dosage of adsorbent and filter media is more than offset by the elimination of the solids generated in the clarification process (phosphoric acid, calcium hydroxide, flocculant, and color precipitant). A small amount of sodium hydroxide was used to adjust pH when the clarification was eliminated, and the solids from it are included in the decolorization process solids.

TABLE IV

| | Solids generation KG per ton of Refined Sugar | |
|---|---|---|
| Process | With clarification | Without clarification |
| Clarification process | 2.16 | 0.0 |
| Decolorization process | 1.18 | 1.35 |
| Combined processes | 3.33 | 1.35 |

With the elimination of clarification, additional adsorbent and filter aid are required to reduce the turbidity and color to levels comparable to the levels with clarification. A general concern is the sufficiency of the existing filter capacity to hold the extra solids required to treat the higher color and turbidity levels in the melt liquor. In an unexpected result, the opposite was found to be true. The filter cycles were significantly longer when clarification was eliminated as noted by the information depicted in Table V.

TABLE V

| | Volume filtered per filter cycle (m³) | |
|---|---|---|
| Filter | With clarification | Without clarification |
| 1 | 495 | 712 |
| 2 | 414 | 830 |

TABLE V-continued

| | Volume filtered per filter cycle (m³) | |
|---|---|---|
| Filter | With clarification | Without clarification |
| 3 | 649 | 844 |
| 4 | 599 | 738 |
| 5 | 630 | 729 |
| Average | 557 | 770 |

The nature of the turbidity remaining after phosphatation has a negative impact on the adsorbent filtration process. In this illustrative example, on average, filter cycle life was increased by 38%.

Figure 5:
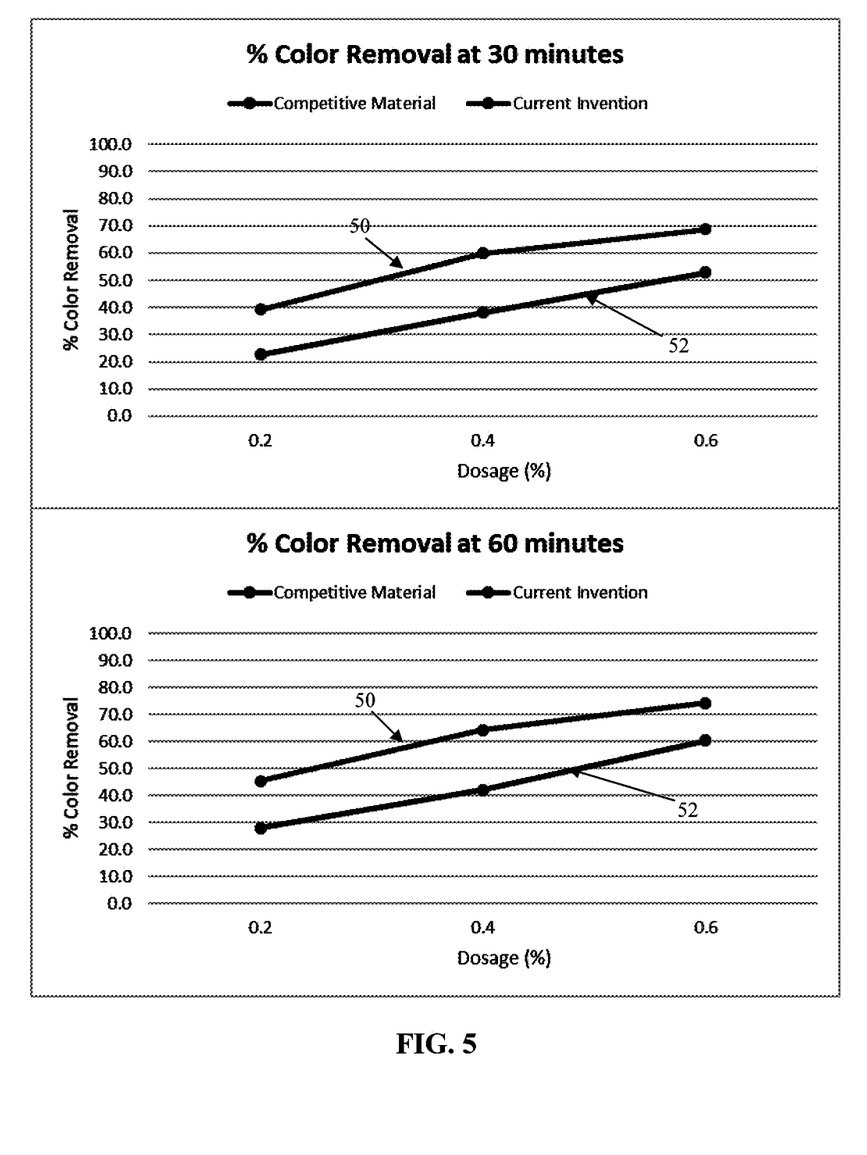
FIG. 5 depicts another representation of the filter media of the current invention performing higher color removal percentage (and capacity) at different dosage rates against competitive filter media of the prior art.

FIG. 5 depicts another representation of the filter media of the current invention 50 performing higher color removal percentage (and capacity) at different dosage rates against competitive filter media of the prior art 52. The optimized formulation allows for both a higher capacity and a better flow, making sugar decolorization easier and less costly. The percent of color removal is on the order of 20% greater at 30 minutes, and remains at least as efficient at 60 minutes.

In one illustrative embodiment, the sorbent portion of the invention is 32.7 wt % carbon and 5.5 wt % resin, the fiber portion is 0.4 wt % and the polyelectrolyte is 0.2 wt %. The remainder of the formulation is adjusted using material containing basic properties (such as sodium hydroxide), such that the pH is 6-8.

In another illustrative embodiment, the sorbent portion of the invention is 29.7 wt % carbon and 8.0 wt % resin, the fiber portion is 0.5 wt % and the polyelectrolyte is 0.2 wt %. The remainder of the formulation is adjusted using a material containing basic properties (sodium hydroxide) such that the pH is 6-8.

In yet another illustrative embodiment, the sorbent portion of the invention is 36.6 wt % carbon, 1.2 wt % resin, and 1.45 wt % inorganic sorbent. The fiber is 0.5 wt % and the polyelectrolyte is 0.2 wt %. The formulation should have a pH between 6 and 8. The rest of the formulation being made up of water. If the pH is alkaline, an acid (HCl, $HNO_3$, etc.) can be used to adjust the pH to within the 6-8 range.

In another illustrative embodiment, the sorbent portion of the invention is 36.6 wt % resin, 1.2 wt % carbon and 1.45 wt % inorganic sorbent. The fiber is 0.5 wt % and the polyelectrolyte is 0.2 wt %. The pH is adjusted to the range of 5-8.

Figure 6:
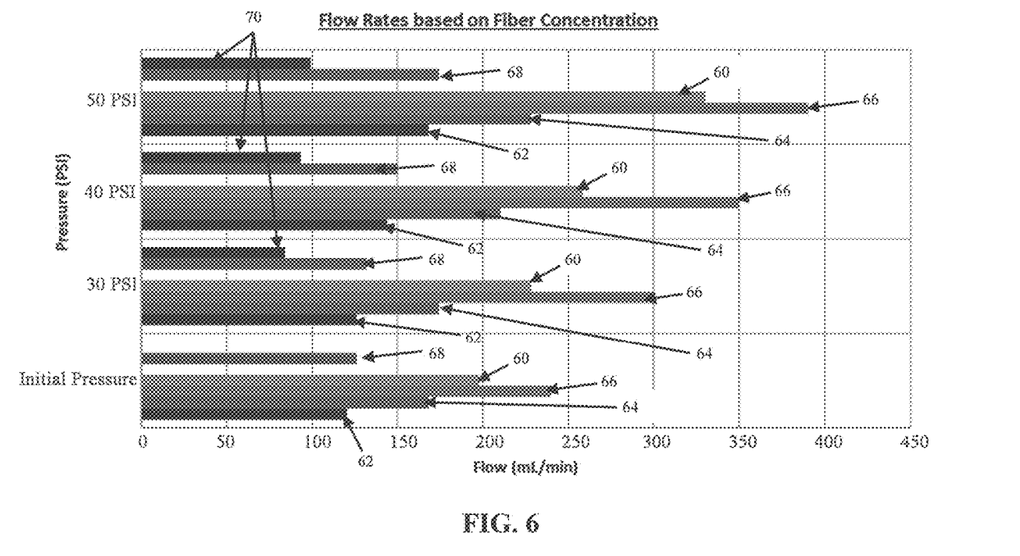
FIG. 6 depicts a graphical presentation of pressure (psi) as a function of flow rate (mL/min) for different fiber concentrations.

The hydraulic properties of the filter media were further investigated. First, flow rates as a function of fiber concentration was considered. FIG. 6 depicts a graphical presentation of pressure (psi) as a function of flow rate (mL/min) for different fiber concentrations. Filter media having different fiber concentrations were compared to competitive material 68, which was KBEVN (15-25 µm D50). The use of another sorbent (carbon) with a particle size of 15-25 µm D50 was used in the flow testing, where the dry weight percentages of the fiber was varied as follows: 1.5% fiber (filter media 60), 0.3% fiber (filter media 62), 0.6% fiber (filter media 64), 1% fiber (filter media 66), and a fiber blend 70.

Adding too much fiber into the filter media resulted in a flow of 0 mL/min at all pressure ranges. Adding too little fiber (0.3 dry wt %) into the filter media resulted in a flow less than the competitive filter media 68 of the prior art. Tests above 0.3% and below 2.0 wt % demonstrated an increase of flow for the preferred filter media composition. A fiber blend 70 of specialty fiber having the characteristic properties wherein the fiber diameter is 200-1500 nanometers, the length is 0.500-1000 micrometers, the Canadian Standard of Freeness measurement is 0-100, and the surface area is 0-200 $m^2/g$, combine with standard fiber of the prior art was also attempted. The results demonstrate that simply mixing fibers is not sufficient enough to provide the desired flow-through characteristics for the application.

Figure 7:
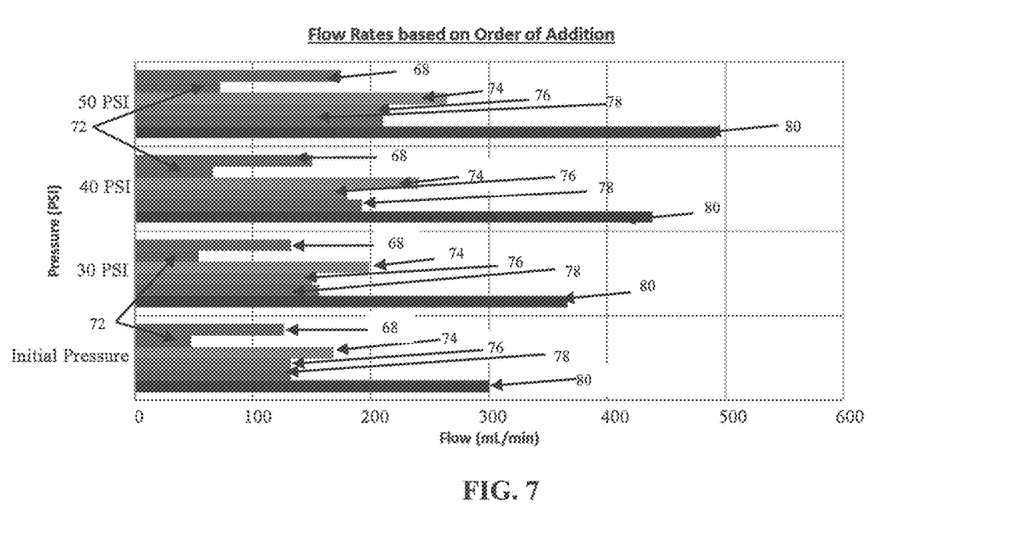
FIG. 7 depicts a graphical presentation of pressure (psi) as a function of flow rate (mL/min) for different order of addition of filter media composition.

FIG. 7 depicts a graphical presentation of pressure (psi) as a function of flow rate (mL/min) for different order of addition of filter media composition. Two types of sorbents (A & B), an electrolyte, water, and specialty fiber, were added in various order or addition to ascertain any distinction in combination. Most notable, the order of addition of the components is demonstrated to be essential. In one of the preferred embodiments, Sorbent A is Carbon and Sorbent B is ion exchange resin. When adding Sorbent A to the reaction chamber first, followed by the Specialty Fiber and Sorbent B and finally the electrolyte, the flow rate is optimized. Changes to the order of addition resulted in significant decreases of the flow rate.

The filter media of different orders of addition were compared to competitive material 68. The following orders of filter media addition were tested:

Filter Media 72 (sorbent A, water, specialty fiber, sorbent B, electrolyte);

Filter Media 74 (specialty fiber, sorbent A, sorbent B, electrolyte, water);

Filter Media 76 (specialty fiber, electrolyte, sorbent B, sorbent A, water);

Filter Media 78 (specialty fiber, sorbent B, sorbent A, electrolyte, water); and Filter Media 80 (sorbent A, specialty fiber, sorbent B, electrolyte, water).

The preferred order was demonstrated to be filter media 80, where sorbent A (carbon) was first added, followed by the specialty fiber (having properties wherein the fiber diameter is 200-1500 nanometers, the length is 0.500-1000 micrometers, the Canadian Standard of Freeness measurement is 0-100, and the surface area is 0-200 $m^2/g$), sorbent B (ion exchange resin), electrolyte, and water.

Figure 8:
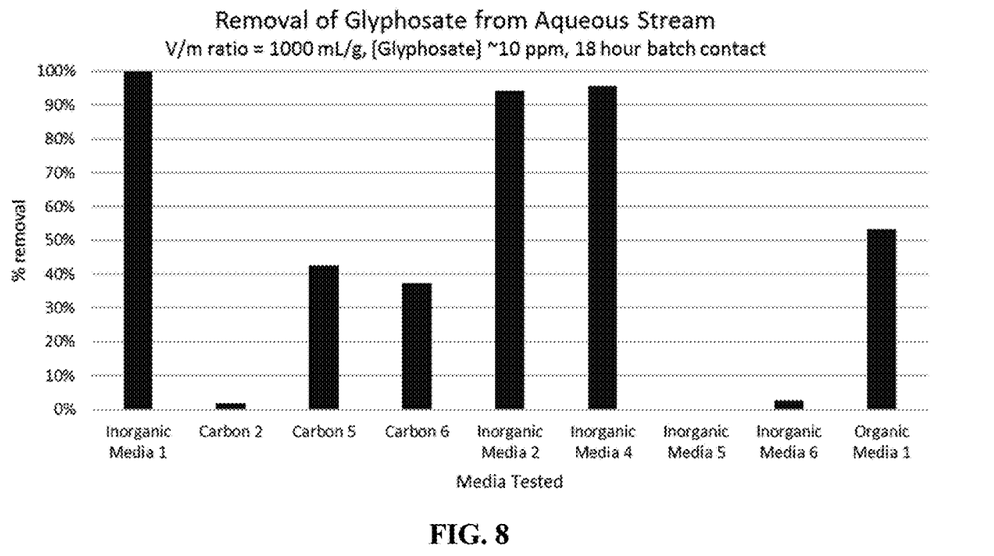
FIG. 8 depicts a graphical presentation of the percent removal of glyphosate (an herbicide) by different sorbents.

FIG. 8 depicts test results of different sorbent constituents for the removal of glyphosate from an aqueous stream. The optimized formulation of the filter media allows for both a higher capacity and a better flow, making sugar decolorization effective and less costly. Various media were tested for the removal of glyphosate in a formulation. Different inorganic media for the removal of oxyanions were considered, in the form of inorganic oxide, such as titanium, iron, zirconium, aluminum, lanthanum, and the like. Inorganic media designed for the removal of cations were tested. Additionally, the tested carbon was in various forms, such as coal, wood, lignite, and coconut based carbons. Dextran based organic media was also considered, such as ion exchange resin organic media.

Figure 9:
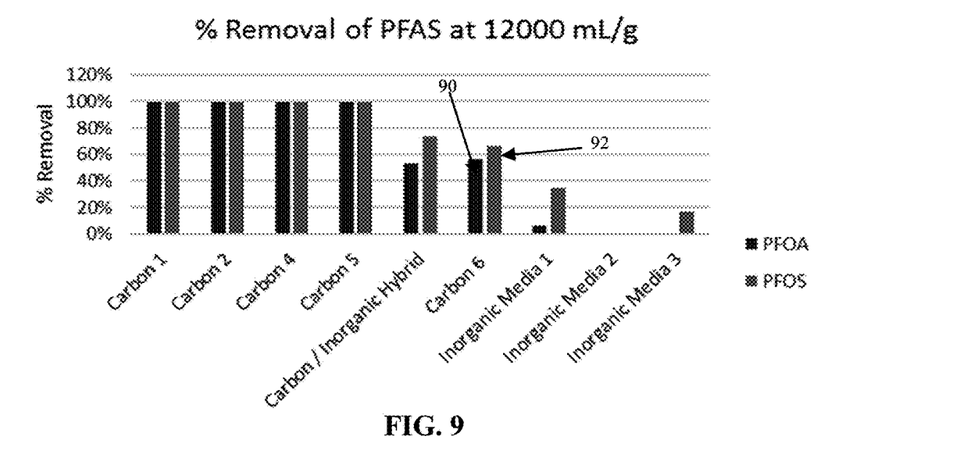
FIG. 9 depicts a graphical presentation of the removal of per- and polyfluoroalkyl substances by different sorbent materials.

FIG. 9 depicts test results of different sorbent constituents for the removal of perfluorinatedalkyl substances (PFAS) at 12000 mL/g from an aqueous stream. The carbons exhibited a high capacity for PFAS (PFOA 90, representing the left bar in each set, and PFOS 92, representing the right bar in each set), indicating that the formulation of the filter media of the present invention is successful at removing PFAS so long as the filter media composition contains substantial portions of carbon, or carbon-inorganic hybrids.

A filter media is taught for implementation in a sugar purification process that allows for a significant increase in sorbent material while maintaining, and enhancing the decolorization and hydraulic properties as compared to prior art filter media. The filter media incorporates sorbent material and fiber having specific properties that allows for small particle sorbent material without jeopardizing the hydraulic properties of the media. The implementation of this filter media in a sugar purification process may eliminate the need for a clarification step during purification while providing for enhanced decolorization.

While the present invention has been particularly described, in conjunction with one or more specific embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A filter media for removing contaminants from and decolorizing liquid sugar comprising:
   a sorbent material 25-50% by weight wherein the sorbent material is an inorganic media, an adsorption media or ion exchange media, or a metal-organic framework;
   a fiber in a compositional range from 0.01 to less than 5% by weight, having a fiber length in the range of 0.5-500 micrometers, a Canadian Standard of Freeness measurement in the range of 0-100, and a surface area in the range of greater than 0 to 200 $m^2/g$; and
   an electrolyte in a compositional range from 0.01-1% by weight;
   wherein the filter media exhibits a flow rate up to 0.119 gpm at 50 PSI.

2. The filter media of claim 1 wherein the sorbent material comprises carbon having a D50 particle size of 1-50 micrometers.

3. The filter media of claim 2 wherein the pore volume of said sorbent material is 1.0-2.5 cc/g.

4. The filter media of claim 2 wherein the surface area of said sorbent material is 1300-1500 $m^2/g$.

5. The filter media of claim 1 wherein the sorbent material includes:
   0.001-99% carbon by weight;
   0.001-99.9% ion exchange resin by weight; and
   0.001-99.9% inorganic sorbent media by weight.

6. A filter media of claim 1, wherein:
   said sorbent material comprises approximately 32.7 wt % carbon and approximately 5.5 wt % ion exchange resin;
   said fiber is in a compositional range of approximately 0.4 wt %; and
   said electrolyte in a compositional range approximately 0.2 wt %.

7. The filter media of claim 6 wherein a final pH is in the range of 6-8.

8. A filter media of claim 1, wherein said sorbent material comprises approximately 29.7 wt % carbon and approximately 8.0 wt % ion exchange resin having a D50 of 1-30 micrometers;
   said fiber is in a compositional range of approximately 0.5 wt %; and
   said electrolyte in a compositional range approximately 0.2 wt %.

9. The filter media of claim 8 wherein a final pH is in the range of 6-8.

10. A filter media of claim 1, wherein said sorbent material comprises approximately 36.6 wt % carbon, approximately 1.2 wt % ion exchange resin having a D50 of 1-30 micrometers, and approximately 1.45% inorganic sorbent;
    said fiber is in a compositional range of approximately 0.5 wt %; and
    said electrolyte in a compositional range approximately 0.2 wt %.

11. The filter media of claim 10 wherein a final pH is in the range of 6-8.

12. The filter media of claim 1 wherein said fiber further comprising a fiber diameter of 200 to less than 250 nanometers.

13. The filter media of claim 1 wherein said fiber further comprises a fiber diameter greater than 1000 to 1500 nanometers.

14. The filter media of claim 1 wherein the filter media comprises a powder mixture.

15. A filter media for removing contaminants from and decolorizing liquid sugar comprising:
    a sorbent material 25-50% by weight wherein the sorbent material is an ion exchange media comprising an ion exchange resin having a D50 of 1-30 micrometers;
    a fiber in a compositional range from 0.01 to less than 5% by weight, said fiber having a fiber length in the range of 0.5-500 micrometers, a Canadian Standard of Freeness measurement in the range of 0-100, and a surface area in the range of greater than 0 to 200 $m^2/g$;
    an electrolyte in a compositional range from 0.01-1% by weight; and
    wherein the filter media exhibits a flow rate up to 0.119 gpm at 50 PSI.

16. A filter media for removing contaminants from and decolorizing liquid sugar comprising:
    a sorbent material 25-50% by weight, wherein the sorbent material is inorganic media, an adsorption media or ion exchange media, or a metal-organic framework;
    a fiber in a compositional range from 0.01 to less than 5% by weight, having a fiber length in the range of 0.5-500 micrometers, a Canadian Standard of Freeness measurement in the range of 0-100, and a surface area in the range of greater than 0 to 200 $m^2/g$;
    an electrolyte in a compositional range from 0.01-1% by weight;
    wherein the sorbent material includes:
    0.001-99% carbon by weight;
    0.001-99.9% ion exchange resin by weight having a D50 of 1-30 micrometers; and
    0.001-99.9% inorganic sorbent media by weight.

17. A filter media for removing contaminants from and decolorizing liquid sugar comprising:
    a sorbent material 25-50% by weight, wherein the sorbent material is inorganic, an adsorption or ion exchange media, or a metal-organic framework, wherein the ion exchange resin has a D50 of 1-30 micrometers, the sorbent material comprises carbon having a D50 particle size of 1-50 micrometers, and a pore volume of said sorbent material being in the range of 1.0-2.5 cc/g, a surface area of said sorbent material being in the range of 1300-1500 $m^2/g$, and wherein said sorbent material includes: 0.001-99% carbon by weight; 0.001-99.9% ion exchange resin by weight; and 0.001-99.9% of said sorbent media by weight;
    a fiber in a compositional range from greater than 0.3% to less than 2.0% by weight, wherein the fiber diameter is 200-1500 nanometers, the length is 0.500-500 micrometers, the Canadian Standard of Freeness measurement is 0-100, and the surface area is 0.1-200 $m^2/g$; and
    an electrolyte in a compositional range from 0.01-1% by weight.

18. A powder mixture filter media for removing contaminants from and decolorizing liquid sugar comprising:

a sorbent material 25-50% by weight, wherein the sorbent material is an inorganic media, an adsorption media or ion exchange media, or a metal-organic framework;

a fiber in a compositional range from 0.01 to less than 5% by weight, having a fiber diameter in the range of 200-1500 nanometers, a fiber length in the range of 0.5-1000 micrometers, a Canadian Standard of Freeness measurement in the range of 0-100, and a surface area in the range of greater than 0 to 200 $m^2/g$; and an electrolyte in a compositional range from 0.01-1% by weight.

\* \* \* \* \*

UNITED STATES PATENT AND TRADEMARK OFFICE
CERTIFICATE OF CORRECTION

| | |
|---|---|
| PATENT NO. | : 11,364,454 B2 |
| APPLICATION NO. | : 16/420720 |
| DATED | : June 21, 2022 |
| INVENTOR(S) | : James Knoll et al. |

It is certified that error appears in the above-identified patent and that said Letters Patent is hereby corrected as shown below:

In the Specification

Column 5, Line 64, change "affiliation" to "affination"

Column 5, Line 64, change "aflination" to "affination"

Column 6, Line 26, change "fowl" to "form"

Column 7, Line 16, change "p.m." to "µm"

Signed and Sealed this
Sixth Day of December, 2022

*Katherine Kelly Vidal*

Katherine Kelly Vidal
*Director of the United States Patent and Trademark Office*